(12) United States Patent
Hayashi et al.

(10) Patent No.: US 9,912,270 B2
(45) Date of Patent: Mar. 6, 2018

(54) MOTOR DRIVE DEVICE

(71) Applicant: DENSO CORPORATION, Kariya, Aichi-pref. (JP)

(72) Inventors: Katsuhiko Hayashi, Kariya (JP); Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 11 days.

(21) Appl. No.: 15/131,499

(22) Filed: Apr. 18, 2016

(65) Prior Publication Data

US 2016/0315570 A1    Oct. 27, 2016

(30) Foreign Application Priority Data

Apr. 21, 2015    (JP) ................... 2015-086572

(51) Int. Cl.
| | | |
|---|---|---|
| *H02P 6/00* | (2016.01) | |
| *H02P 7/29* | (2016.01) | |
| *H02P 7/03* | (2016.01) | |
| *B62D 5/04* | (2006.01) | |

(52) U.S. Cl.
CPC ............... *H02P 7/29* (2013.01); *B62D 5/046* (2013.01); *H02P 7/04* (2016.02)

(58) Field of Classification Search
USPC ..... 318/501, 400.29, 400.25, 602, 599, 283, 318/282
See application file for complete search history.

(56) References Cited

U.S. PATENT DOCUMENTS

| | | |
|---|---|---|
| 4,950,919 A | 8/1990 | Rossi et al. |
| 5,309,078 A | 5/1994 | Cameron |
| 2005/0134211 A1 | 6/2005 | Fukamizu et al. |
| 2007/0126383 A1 | 6/2007 | Takata et al. |
| 2008/0297959 A1 | 12/2008 | Tanabe et al. |
| 2009/0135531 A1* | 5/2009 | Hirata .................... H02H 3/093 361/18 |

FOREIGN PATENT DOCUMENTS

| | | |
|---|---|---|
| JP | 2007318936 A | 12/2007 |
| JP | 2010239815 A | 10/2010 |

* cited by examiner

*Primary Examiner* — Eduardo Colon Santana
*Assistant Examiner* — Iftekhar Mustafa
(74) *Attorney, Agent, or Firm* — Knobbe, Martens, Olson & Bear, LLP (57) ABSTRACT

A motor drive device includes: a drive circuit unit having a plurality pair of switching elements and a plurality pair of free wheel diodes connected in parallel to the plurality pair of switching elements respectively; and a controller that turns on/off the switching elements. The controller performs a synchronous rectification control in which at least one pair of the switching elements is complementarily turned on/off, or performs an asynchronous rectification control in which the synchronous rectification control is not performed. The controller has a variation restriction portion that restricts a variation in current that is caused by a switch from one of the synchronous rectification control and the asynchronous rectification control to the other.

5 Claims, 7 Drawing Sheets

MOTOR DRIVE DEVICE

CROSS REFERENCE TO RELATED APPLICATION

This application is based on Japanese Patent Application No. 2015-86572 filed on Apr. 21, 2015, the disclosure of which is incorporated herein by reference in its entirety.

TECHNICAL FIELD

The present disclosure relates to a motor drive device.

BACKGROUND

A motor drive device has a drive circuit in which switching elements such as transistors are connected in series on the high potential side and on the low potential side. In the motor drive device, electric current is controlled by pulse width modulation (PWM) control. In the PWM control, while one of the switching elements is turned off, back electromotive force arises in a motor coil, and current flows in a free wheel diode disposed parallel to the other switching element.

JP S63-304715A (corresponding to U.S. Pat. No. 4,950,919) describes a synchronous rectification control to reduce loss of electric power that is caused by the current flowing in a free wheel diode. In the synchronous rectification control, while the current flows into the free wheel diode, a switching element having a low on-resistance and connected in parallel with the free wheel diode is made conducted.

SUMMARY

When the state where performing a synchronous rectification control and the state where not carrying out the synchronous rectification control are switched from each other, the current may be varied by the switch, compared with a case where the synchronous rectification control is always performed. For example, when a motor drive device is applied to an electric power-steering equipment, a temporary change in the current may lead a change in the steering or a change in the steering feeling of a driver.

It is an object of the present disclosure to provide a motor drive device in which a current change caused by a switch in a synchronous rectification control is reduced.

According to an aspect of the present disclosure, a motor drive device includes: a drive circuit unit having a plurality pair of switching elements bridge-connected, and a plurality pair of free wheel diodes connected in parallel to the plurality pair of switching elements respectively; and a controller that turns on/off the switching elements. The drive circuit unit converts electric power of a direct-current power supply and drives a motor by turning on/off the switching elements. The controller performs a synchronous rectification control in which at least one pair of the switching elements is complementarily turned on/off, or performs an asynchronous rectification control in which the synchronous rectification control is not performed. The controller has a variation restriction portion that restricts a variation in current that is caused by a switch from one of the synchronous rectification control and the asynchronous rectification control to the other.

Thereby, the current change caused by the switch in the synchronous rectification control can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
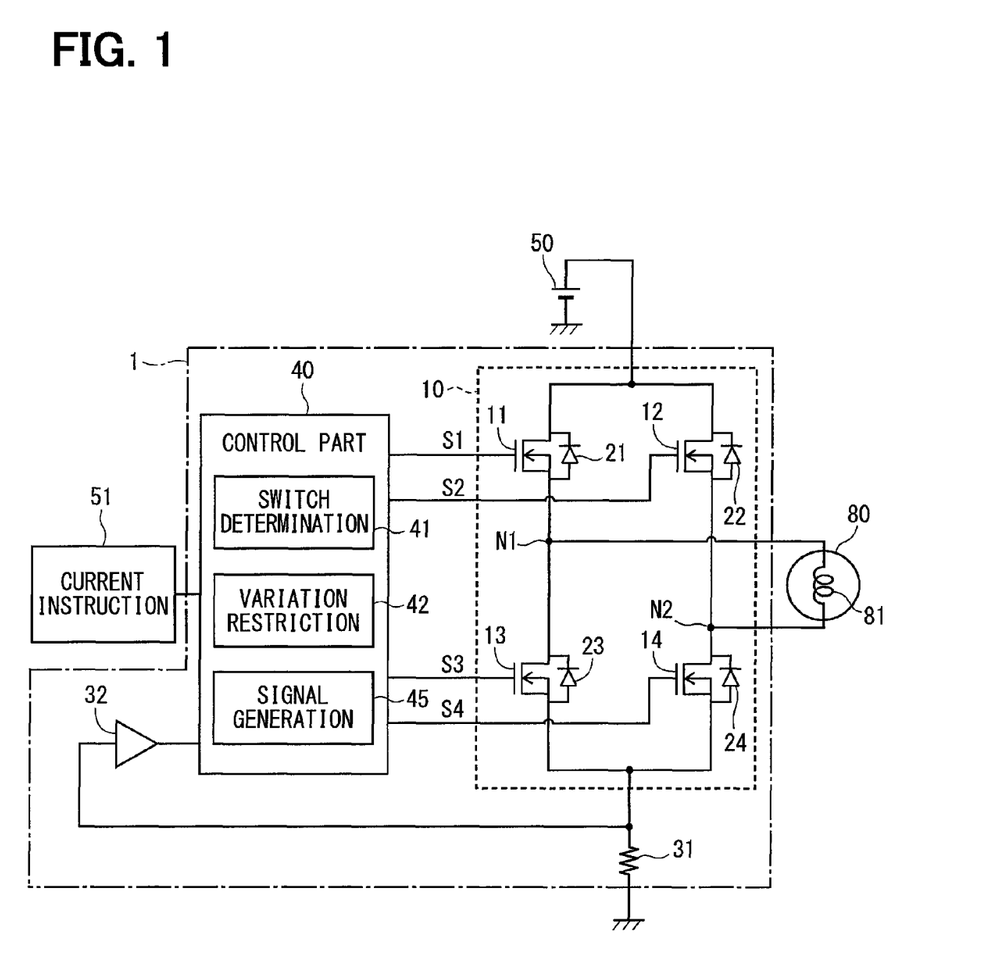
FIG. 1 is a block diagram illustrating a motor drive device according to a first embodiment.

A motor drive device 1 according to a first embodiment is described with reference to FIG. 1-FIG. 5. As shown in FIG. 1, the motor drive device 1 controls a motor 80. The motor drive device 1 and the motor 80 are applied, for example, to an electric power-steering equipment for a vehicle. The motor 80 outputs an auxiliary torque to assist a steering by a driver. The motor 80 is a direct-current motor which has a winding 81.

A current instruction part 51 calculates a current instruction value which is a current flowing through the winding 81 based on information such as electric angle of the motor 80, steering torque, and vehicle speed. The drive of the motor 80 is controlled by the motor drive device 1 based on the current instruction value.

The motor drive device 1 includes a drive circuit unit 10 and a controller 40, and converts and outputs the electric power of a direct-current power supply 50 to the motor 80. The drive circuit unit 10 has transistors 11-14 and free wheel diodes 21-24. Transistors 11-14 may correspond to switching elements.

The transistors 11-14 are bridge-connected to configure H bridged circuit. In detail, the transistor 11 and the transistor 13 are connected in series, and the transistor 12 and the transistor 14 are connected in series. The transistor 11, 13 and the transistor 12, 14, which make a pair, are connected in parallel. One end of the winding 81 is connected to a connecting point N1 of the transistors 11 and 13, and the other end of the winding 81 is connected to a connecting point N2 of the transistors 12 and 14.

The free wheel diodes 21-24 are connected in parallel to the transistors 11-14, respectively, and are able to conduct current from the low potential side to the high potential side. When the transistors 11-14 are, for example, MOSFET (metal oxide semiconductor field effect transistor), the free wheel diodes 21-24 may be parasitism diode inside an element. Alternatively, the free wheel diodes 21-24 may be external diodes.

A current detecting element 31 is disposed on the grounding side of the transistors 12 and 14 connected on the low potential side, and detects the current which flows into the motor 80. The current detecting element 31, in this embodiment, is shunt resistance. The detection value of the current detecting element 31 is fed back to the controller 40 via a buffer 32 which is, for example, an operational amplifier.

The controller 40 has a microcomputer and a pre-driver, and controls the ON/OFF operation of the transistors 11-14. In addition, each processing in the controller 40 may be a software process by executing a program memorized beforehand by CPU, and may be hardware processing by an electronic circuit for exclusive use.

The controller 40 has a switch determination part 41, a variation restriction part 42, and a signal generation part 45 as functional block. The switch determination part 41 determines whether one of the synchronous rectification state and the asynchronous rectification state is to be switched to the other based on, for example, the energizing amount of the winding 81. The synchronous rectification control is not performed in the asynchronous rectification state, while the synchronous rectification control is performed in the synchronous rectification state.

The variation restriction part 42 restricts a variation in the current caused by the switch from one of the synchronous rectification state and the asynchronous rectification state to the other, for example, when the synchronous rectification state is switched to the asynchronous rectification state or when the asynchronous rectification state is switched to the synchronous rectification state. The details of the control to restrict the variation in the current are mentioned later. The signal generation part 45 generates drive signals S1-S4 to control the on/off operation of the transistors 11-14.

The motor drive control and the synchronous rectification control by the controller 40 are explained based on FIG. 2A to FIG. 3B. The switching of the transistor 11-14 is controlled based on the rotational direction of the motor 80 in the control of the drive circuit unit 10 which is H bridged circuit.

When the motor 80 is rotated in the normal direction, the transistor 11 is always ON and the transistor 14 is turned on and off with the duty according to a current instruction value as the PWM control. Moreover, the duty of the transistor 14 is increased or decreased by comparing the current instruction value with the current detection value detected by the current detecting element 31.

When the motor 80 is rotated in the inversion direction, although illustration is omitted, the transistor 12 is always ON, and the transistor 13 is turned on and off with the duty according to a current instruction value. Hereafter, the case is explained as an example where the motor 80 is rotated in the normal direction.

Figure 2A:
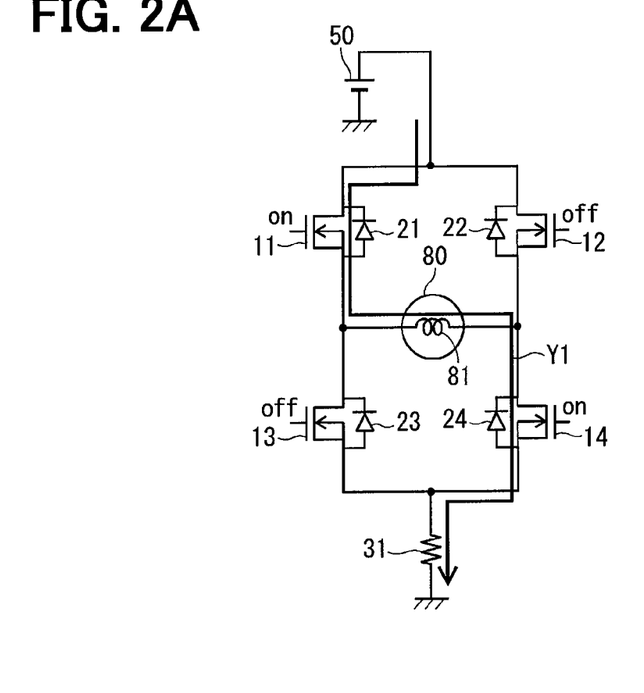
FIG. 2A and FIG. 2B are diagrams explaining a current course when not performing a synchronous rectification control in the first embodiment.
Figure 2B:
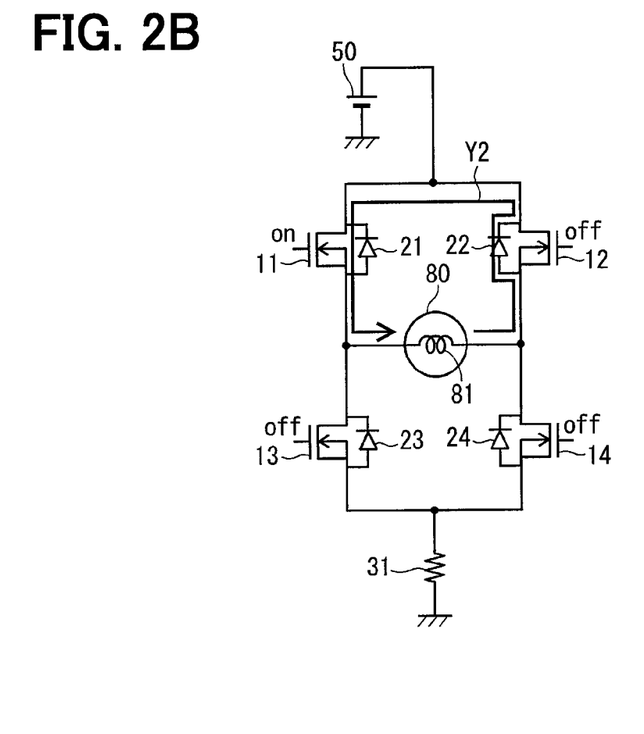

FIG. 2A and FIG. 2B show operation when not performing the synchronous rectification control.

As shown in FIG. 2A, when the transistor 14 is on, as shown by the arrow Y1, current flows via the transistor 11, the winding 81, and the transistor 14. At this time, the current which flows into the current detecting element 31 is detected, and is fed back to the controller 40 via the buffer 32.

As shown in FIG. 2B, when the transistor 14 is off, as shown by the arrow Y2, the regeneration current flows via the transistor 11, the winding 81, and the free wheel diode 22 connected in parallel with the transistor 12.

Figure 3A:
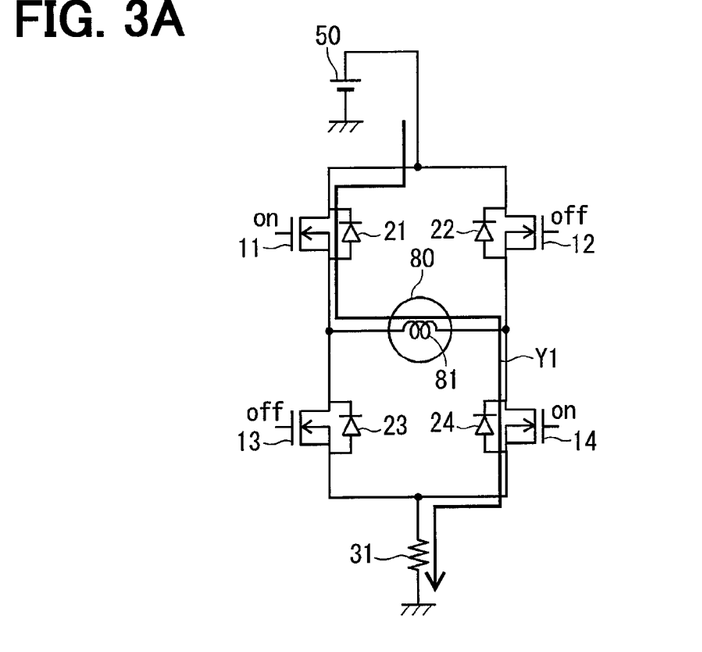
FIG. 3A and FIG. 3B are diagrams explaining a current course when performing the synchronous rectification control in the first embodiment.
Figure 3B:
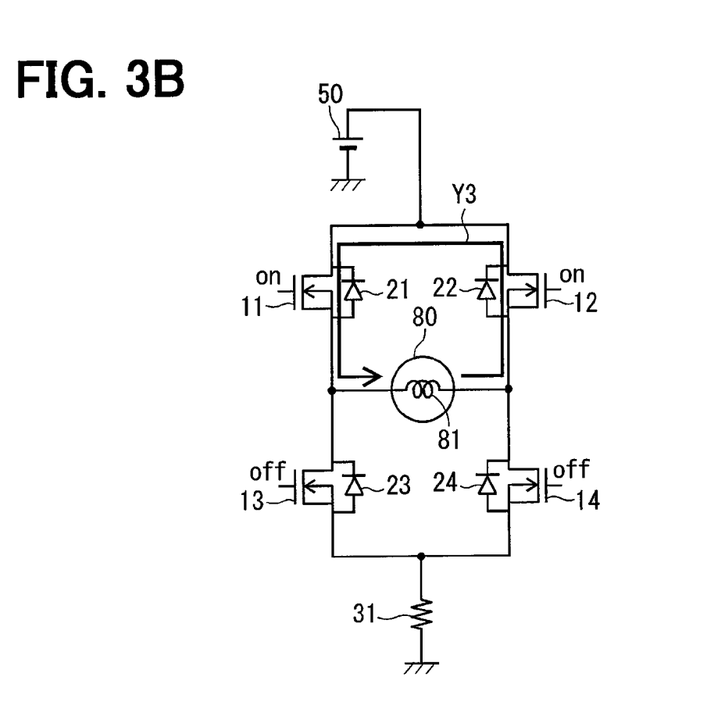

FIG. 3A and FIG. 3B show operation when performing the synchronous rectification control. When performing the synchronous rectification control, the transistors 12 and 14 are turned on/off complementarily. That is, the transistor 12 is turned off when the transistor 14 is ON, and the transistor 12 is turned on when the transistor 14 is OFF.

As shown in FIG. 3A, when the transistor 12 is OFF and when the transistor 14 is ON, similarly to FIG. 2A, as shown by the arrow Y1, current flows via the transistor 11, the winding 81, and the transistor 14.

As shown in FIG. 3B, when the transistor 12 is ON and the transistor 14 is OFF, as shown by the arrow Y3, the regeneration current flows via the transistor 11, the winding 81, and the transistor 12.

As explained with FIG. 2A to FIG. 3B, since the course of regeneration current when performing the synchronous rectification control differs from the course of regeneration current when not performing the synchronous rectification control, the voltage impressed to the winding 81 varies.

Figure 7:
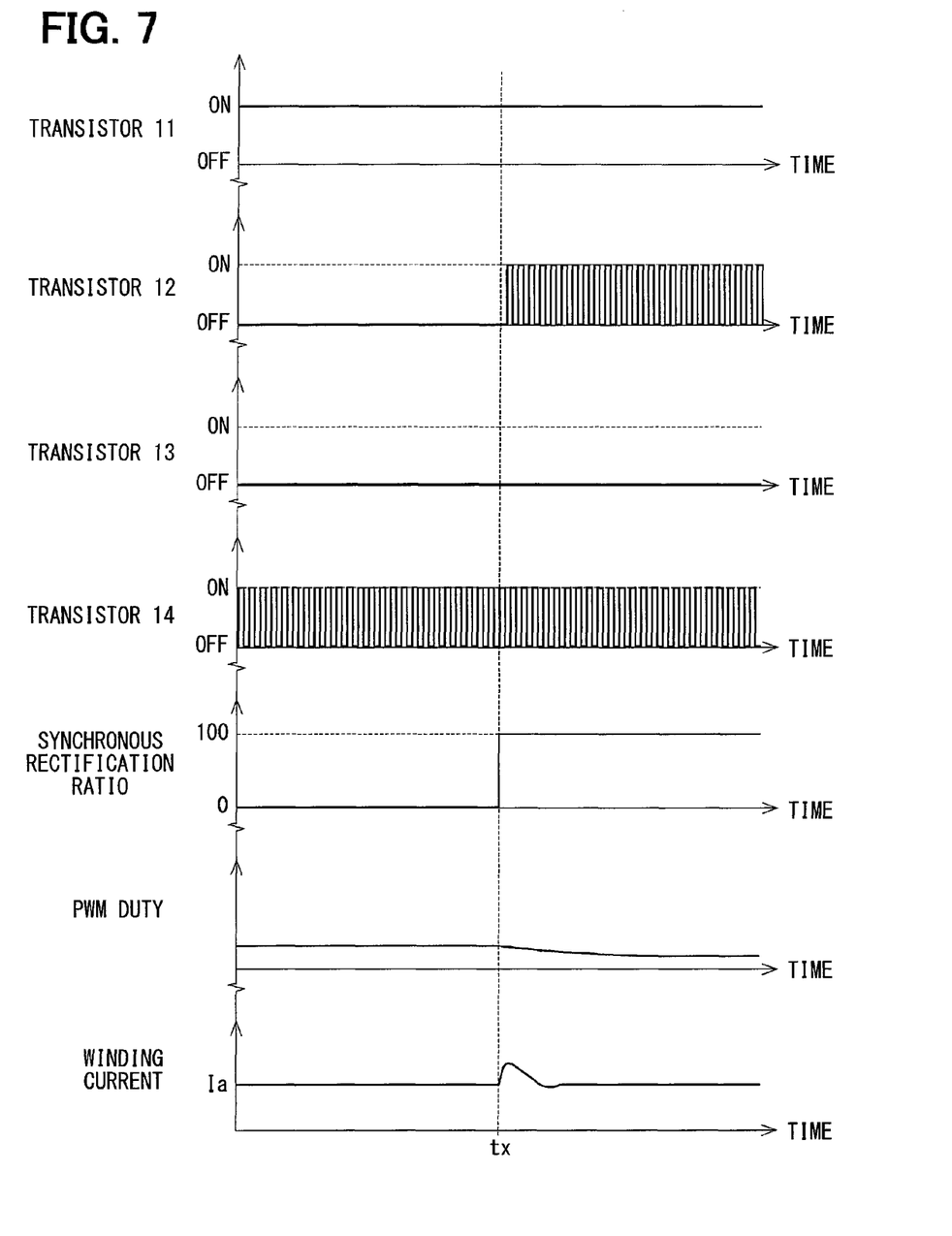
FIG. 7 is a time chart of a comparison example to explain a switch from an asynchronous rectification state to a synchronous rectification state.

FIG. 7 shows a comparison example, in which the current flowing into the winding 81 is varied at a timing tx when the asynchronous rectification state is switched to the synchronous rectification state. The current flowing into the winding 81 is changed by the switch from the asynchronous rectification state to the synchronous rectification state. When the current which flows into the winding 81 is varied, the duty of the transistor 14 is changed to restrict the variation in the current, and the variation converges. The current variation caused by the switch in the synchronous rectification control is remarkable when the duty of the transistor 14 is small, since the ratio of the synchronous rectification control is large at this time.

Since the motor drive device 1 is applied to the electric power-steering equipment in this embodiment, the current variation caused by the switch in the synchronous rectification control may affect the steering angle or the steering feeling of a driver.

In FIG. 7, the comparison example is shown when switching the asynchronous rectification state to the synchronous rectification state, and the same in a case where the synchronous rectification state is switched to the asynchronous rectification state.

In this embodiment, the variation restriction part 42 changes the duty of the transistor 14 according to a current instruction value when changing one of the synchronous rectification state and the asynchronous rectification state to the other.

Figure 4:
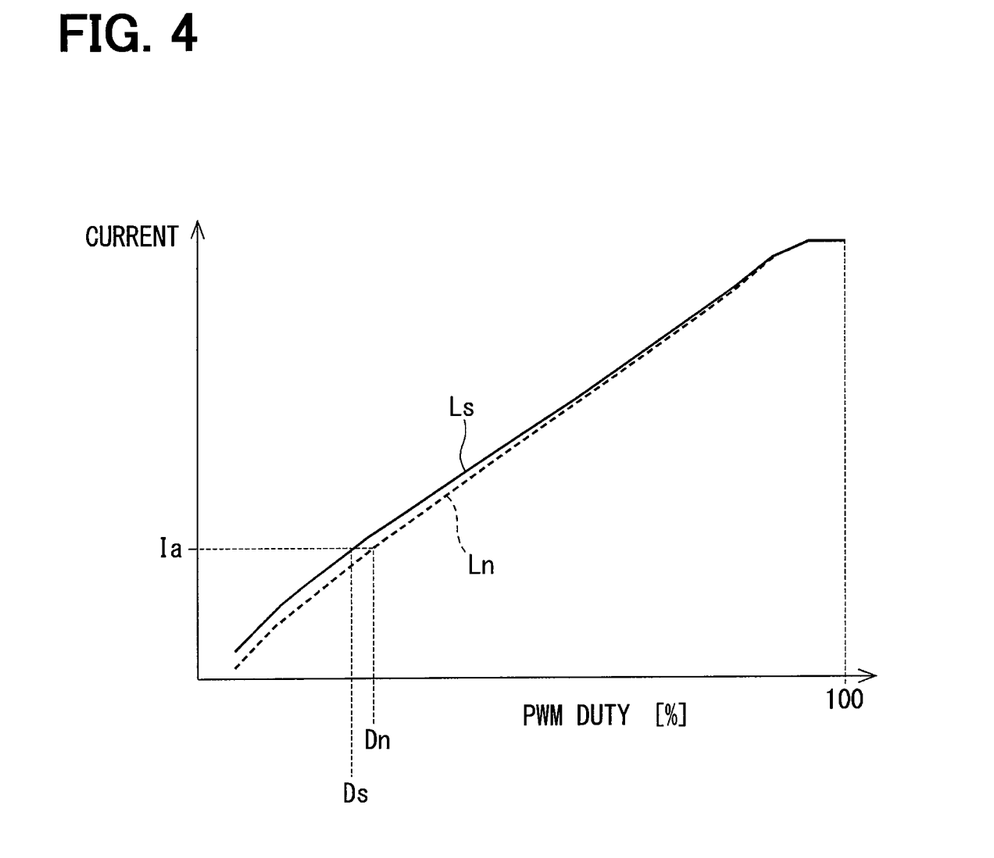
FIG. 4 is a graph explaining a relation between a PWM duty and a current flowing into a winding of a motor, in which a solid line represents a case with the synchronous rectification control of the first embodiment and a dashed line represent a case without the synchronous rectification control.

FIG. 4 shows a relationship between the current and the duty in the first embodiment. A solid line Ls represents a case where performing the synchronous rectification control, and a dashed line Ln represents a case where not performing the synchronous rectification control. As shown in FIG. 4, the duty for producing the same current to the winding 81 is different between the case performing the synchronous rectification control and the case not performing the synchronous rectification control. In particular, when the duty of the transistor 14 is small, the difference in the current of the winding 81 becomes large.

A storage part (not shown) of the controller 40 is made to memorize the map shown in FIG. 4 beforehand in this embodiment. When one of the synchronous rectification state and the asynchronous rectification state is switched to the other, the duty of the transistor (the transistor 14 when the motor 80 is rotated in the normal direction) is changed, which is switched according to the drive request of the motor 80 not based on the synchronous rectification control.

For example, when a current instruction value is Ia, and when the synchronous rectification state is switched to the asynchronous rectification state, the duty of the transistor 14 is changed to Dn from Ds. When a current instruction value is Ia and when the asynchronous rectification state is switched to the synchronous rectification state, the duty of the transistor 14 is changed to Ds from Dn. The duty of the transistor 14 is reduced when the asynchronous rectification state is switched to the synchronous rectification state. The duty of the transistor 14 is increased when the synchronous rectification state is switched to the asynchronous rectification state (i.e., Ds<Dn).

Figure 5:
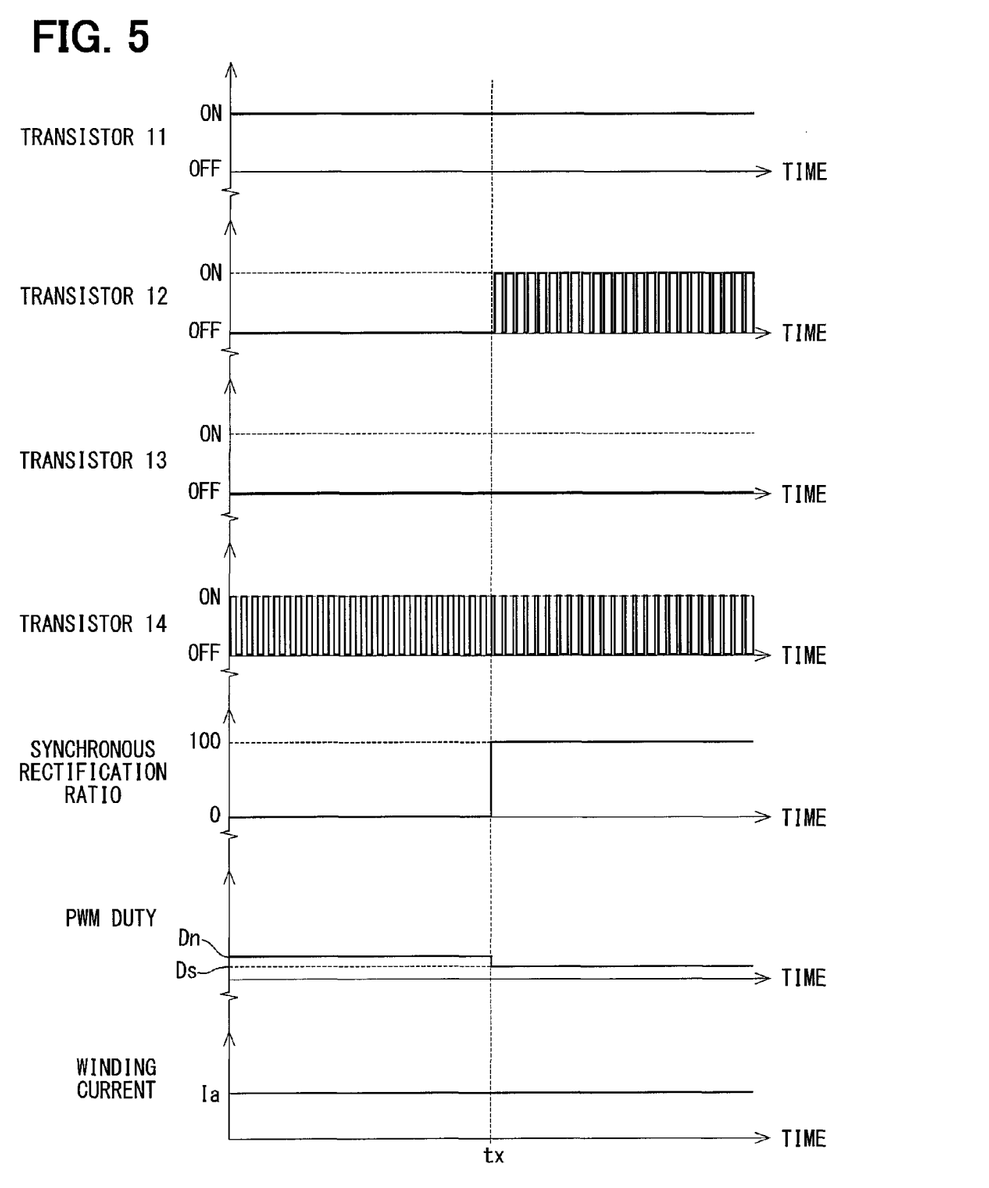
FIG. 5 is a time chart in the first embodiment to explain a switch from an asynchronous rectification state to a synchronous rectification state.

FIG. 5 represents a case where the asynchronous rectification state is switched to the synchronous rectification state while the motor 80 is rotated in the normal direction. FIG. 5 shows a time chart describing ON/OFF state of the transistors 11-14, the ratio of synchronous rectification, the PWM duty of the transistor 14, and the current which flows into the winding 81. In this embodiment, the ratio of synchronous rectification is a percentage of the time period of synchronous rectification state per unit time. The ratio of synchronous rectification is 100% in the synchronous rectification state. The ratio of synchronous rectification is 0% in the asynchronous rectification state. The same applies to FIG. 6 and FIG. 7.

When the motor 80 is rotated in the normal direction, the transistor 11 is always on, and the transistor 13 is always off, not depending on the synchronous rectification control.

When not performing the synchronous rectification control, the transistor 12 is off, and the transistor 14 is turned on and off by the duty according to a current instruction value. Thereby, the current according to the current instruction value flows into the winding 81.

As shown in FIG. 5, at the time tx, the asynchronous rectification state is switched to the synchronous rectification state. At this time, the duty of the transistor 14 is changed according to the current instruction value. For example, when the current instruction value is Ia, the duty is changed to Ds from Dn. Moreover, when the transistor 14 is on, the transistor 12 is complementarily turned off. When the transistor 14 is off, the transistor 12 is complementarily turned on. In other words, the transistor 12 is complementarily turned on and off with respect to the transistor 14. Thus, even when there is a switch in the synchronous rectification control, no variation occurs in the current flowing into the winding 81 according to the current instruction value by changing the duty of the transistor 14 based on the switch in the synchronous rectification control.

According to the first embodiment, the motor drive device 1 includes the drive circuit unit 10 and the controller 40. The drive circuit unit 10 has the transistors 11-14 bridge-connected and the free wheel diodes 21-24 connected in parallel to the transistors 11-14, respectively. The electric power of the direct-current power supply 50 is converted to drive the motor 80 by turning on/off the transistors 11-14.

The controller 40 controls the on/off operation of the transistors 11-14. In a synchronous rectification state, at least one pair of the transistors 11-14 is complementarily turned on/off as a synchronous rectification control. It is defined that the synchronous rectification control is not performed in an asynchronous rectification state. The controller 40 has the variation restriction part 42. The variation restriction part 42 restricts the current variation caused by the switch from one of the synchronous rectification state and the asynchronous rectification state to the other.

Thereby, the current variation caused by a switch in the synchronous rectification control can be reduced. When the motor drive device 1 is applied to an electric power-steering equipment, a change in the steering or the steering feeling of a driver can be restricted by reducing the variation in the current.

The variation restriction part 42 changes the duty of the transistor 14 that is switched according to the drive request of the motor 80, when one of the synchronous rectification state and the asynchronous rectification state is switched to the other. Thereby, the current variation caused by a switch in the synchronous rectification control can be reduced appropriately. In this embodiment, the variation restriction part 42 corresponds to a "variation restriction portion."

Second Embodiment

A second embodiment is described with reference to FIG. 6. The variation restriction control of the first embodiment is modified in the second embodiment, and the configuration of the motor drive device 1 is the same in the second embodiment as the first embodiment.

Figure 6:
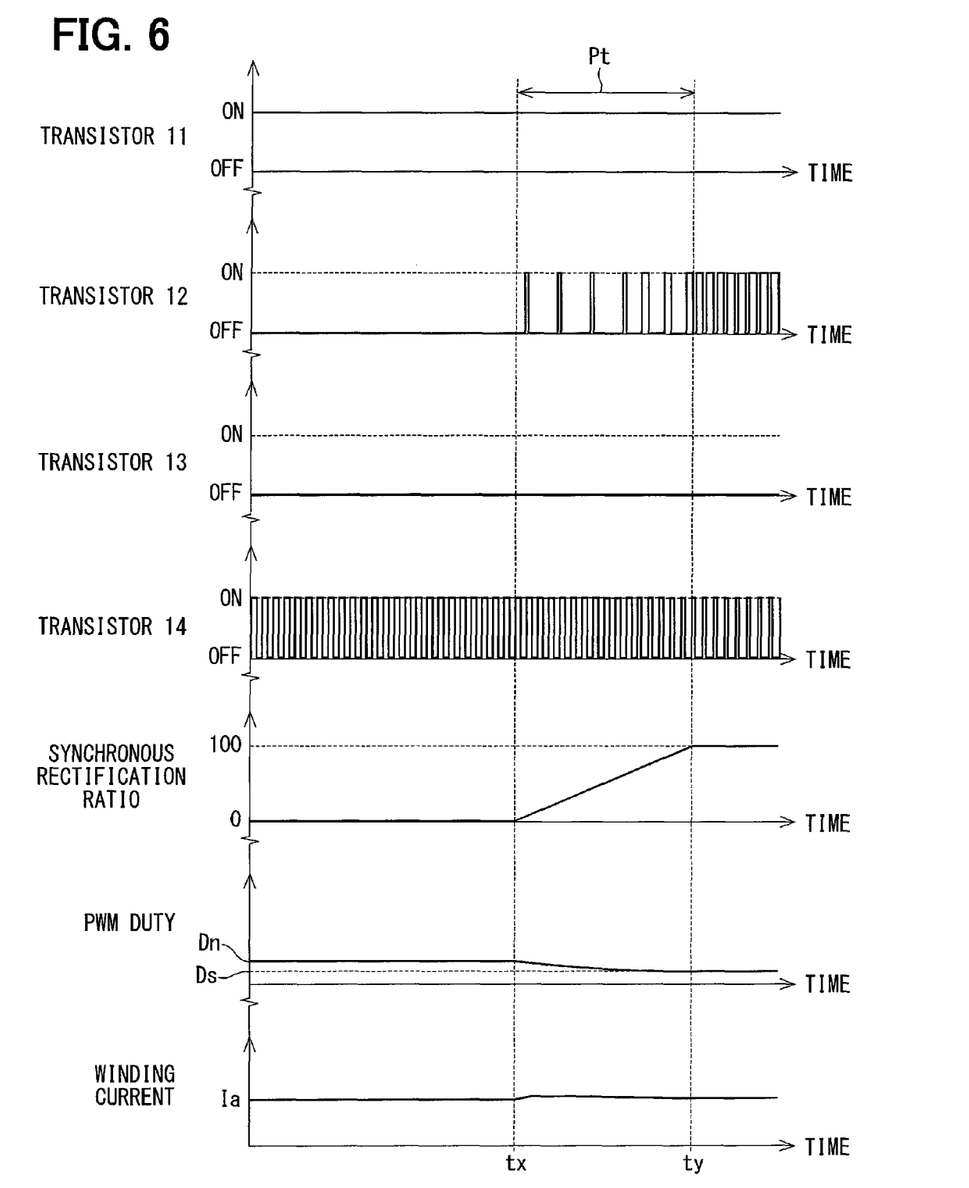
FIG. 6 is a time chart in a second embodiment to explain a switch from an asynchronous rectification state to a synchronous rectification state.

As shown in FIG. 6, a transition period Pt is defined during which one of the synchronous rectification state and the asynchronous rectification state is switched to the other. The transition period Pt may be set as a predetermined time period or may be variable according to the energization amount.

The ratio of the other of the synchronous rectification state and the asynchronous rectification state is made gradually larger during the transition period Pt. That is, when an asynchronous rectification state is switched to a synchronous rectification state, the ratio of the synchronous rectification state is gradually increased. When a synchronous rectification state is switched to an asynchronous rectification state, the ratio of the asynchronous rectification state is gradually increased.

FIG. 6 shows a case where the asynchronous rectification state is switched to the synchronous rectification state while the motor 80 is rotated in the normal direction. The ratio of the synchronous rectification is gradually increased from the time tx which is a start timing of the transition period Pt. At the time ty which is an end timing of the transition period Pt, the ratio of the synchronous rectification is 100%. In the example shown in FIG. 6, the ratio of the synchronous rectification is changed linearly. Alternatively, the ratio of the synchronous rectification may be changed stepwise. In the transition period Pt, the transistors 12 and 14 are controlled by repeating the asynchronous rectification state and the synchronous rectification state in a manner that the synchronous rectification state is increased little by little.

As shown in FIG. 6, when a current instruction value is Ia, the PWM duty of the transistor 14 approaches Ds from Dn by feedback control (refer to FIG. 4). Thereby, as shown in FIG. 6, the variation in current of the winding 81 is reduced.

According to the second embodiment, it is not necessary to provide a map of duty according to a current instruction value relative to the synchronous rectification control. Therefore, use of memory can be suppressed in the second embodiment as compared with the first embodiment.

When changing one of the synchronous rectification state and the asynchronous rectification state to the other during the transition period Pt, the ratio of the synchronous rectification state to the asynchronous rectification state is changed gradually by the variation restriction part 42 during the transition period Pt. Thereby, the current variation caused by switch in the synchronous rectification state can be controlled appropriately.

Other Embodiment

In the above-mentioned embodiment, a current instruction value is acquired from a current instruction part. Alternatively, information such as electric angle of a motor, steering torque, and vehicle speed may be inputted into the controller, and a current instruction value may be calculated inside the controller. That is, the controller may have a current instruction part. Moreover, the controller may have an AD converter to receive the detection value of the current detecting element 31.

In the above-mentioned embodiment, a current detecting element is prepared on the low potential side of H bridged circuit. Alternatively, a current detecting element may be prepared on the high potential side of H bridged circuit, and may be prepared in series of the winding of a motor.

In the above-mentioned embodiment, a current detecting element is shunt resistance. Alternatively, a current detecting element may be, for example, Hall IC instead of the shunt resistance.

In the above-mentioned embodiment, MOSFET is used as a switching element. Alternatively, a switching element may be a field effect transistor, other than MOSFET, or insulated gate bipolar transistor (IGBT).

In the above-mentioned embodiment, a motor is a direct-current motor, and the drive circuit unit is H bridged circuit. Alternatively, a motor may be multi-phase AC motor, and the drive circuit unit may be multi-phase inverter.

In the above-mentioned embodiment, a motor is applied to an electric power-steering equipment. Alternatively, a motor may be applied to other equipment other than the electric power-steering equipment.

Such changes and modifications are to be understood as being within the scope of the present disclosure as defined by the appended claims.

What is claimed is:

1. A motor drive device comprising:
   a drive circuit unit having
      a plurality pair of switching elements bridge-connected, and
      a plurality pair of free wheel diodes connected in parallel to the plurality pair of switching elements respectively, wherein the drive circuit unit converts electric power of a direct-current power supply and drives a motor by turning on/off the switching elements; and
   a controller that turns on/off the switching elements, wherein
   the controller performs a synchronous rectification control in which at least one pair of the switching elements is complementarity turned on/off, or performs an asynchronous rectification control in which the synchronous rectification control is not performed, and
   the controller has a variation restriction portion that restricts a variation in current that is caused by a switch from one of the synchronous rectification control and the asynchronous rectification control to the other so that a course of regeneration current when performing the synchronous rectification control is different from a course of regeneration current when performing the asynchronous rectification control,
   wherein a change in the course of regeneration current causes a variation in a voltage impressed to a winding of the motor when the course of regeneration current is changed between the synchronous rectification control and the asynchronous rectification control, and
   the variation in the voltage causes a variation in current flowing through a winding of the motor, and
   the variation restriction portion changes a duty of the switching element that is switched according to a drive request of the motor to restrict the variation in the current flowing through the winding of the motor.

2. The motor drive device according to claim 1, wherein when one of the synchronous rectification control and the asynchronous rectification control is switched to the other during a transition period, the variation restriction portion gradually changes a ratio of the synchronous rectification control to the asynchronous rectification control during the transition period.

3. The motor drive device according to claim 1, wherein the plurality pair of switching elements bridge-connected comprising: a first transistor and a third transistor connected with each other in series; and a second transistor and a fourth transistor connected with each other in series,
   the second transistor is off when the fourth transistor is on, and the second transistor is on when the fourth transistor is off in the synchronous rectification control, and
   the second transistor is off when the fourth transistor is on, and the second transistor is off when the fourth transistor is off in the asynchronous rectification control.

4. The motor drive device according to claim 3, wherein when the second transistor is on and the fourth transistor is off in the synchronous rectification control, a regeneration current flows via the first transistor, a winding of the motor, and the second transistor, and
   when the second transistor is off and the fourth transistor is off in the asynchronous rectification control, a regeneration current flows via the first transistor, the winding of the motor, and one of the free wheel diodes connected in parallel with the second transistor.

5. The motor drive device according to claim 4, wherein the variation restriction portion changes a duty of the fourth transistor when changing one of the synchronous rectification state and the asynchronous rectification state to the other.

* * * * *